US005767893A

United States Patent [19]
Chen et al.

[11] Patent Number: 5,767,893
[45] Date of Patent: Jun. 16, 1998

[54] METHOD AND APPARATUS FOR CONTENT BASED DOWNLOADING OF VIDEO PROGRAMS

[75] Inventors: Ming-Syan Chen, Yorktown Heights; Chung-Sheng Li, Ossining; Philip Shi-lung Yu, Chappaqua, all of N.Y.

[73] Assignee: International Business Machines Corporation, Armonk, N.Y.

[21] Appl. No.: 540,727

[22] Filed: Oct. 11, 1995

[51] Int. Cl.$^6$ .................................................. H04N 7/10
[52] U.S. Cl. .................... 348/7; 348/1; 348/10; 348/460
[58] Field of Search .................... 348/1, 7, 10, 460, 348/3, 12, 13; 395/200.47; 382/170

[56] References Cited

U.S. PATENT DOCUMENTS

| | | | |
|---|---|---|---|
| 4,888,796 | 12/1989 | Olivo, Jr. | 348/460 |
| 4,967,273 | 10/1990 | Greenberg | 348/460 |
| 5,253,061 | 10/1993 | Takahama et al. | 348/460 |
| 5,410,344 | 4/1995 | Graves et al. | 348/10 |
| 5,534,911 | 7/1996 | Levitan | 348/1 |
| 5,619,247 | 4/1997 | Russo | 348/3 |
| 5,621,454 | 4/1997 | Ellis et al. | 348/907 |
| 5,640,193 | 6/1997 | Wellner | 348/7 |
| 5,684,918 | 11/1997 | Abecassis | 386/46 |

FOREIGN PATENT DOCUMENTS

| | | |
|---|---|---|
| 0158293 | 10/1985 | European Pat. Off. . |
| 2229595 | 9/1990 | United Kingdom . |
| 90/03706 | 4/1990 | WIPO . |
| 91/00570 | 1/1991 | WIPO . |
| 91/00670 | 1/1991 | WIPO . |

OTHER PUBLICATIONS

Smith, J. et al., "Quad-Tree Segmentation for Texture-Based Image Query" *Proceeding ACM Multimedia 94*, pp. 1–15, San Francisco, 1994.

Smoliar, S. et al., "Content-Based Video Indexing and Retrieval", *IEEE Multimedia*, pp. 62–72 (Summer 1994).

Niblack, W. et al., "The QBIC Project: Querying Images by Content Using Color, Texture, and Shape", *IBM Computer Science Research Report*, pp. 1–20 (Feb. 1, 1993).

"Shape Analysis", *Digital Image Processing*, Pratt, Wiley, New York, 1991.

"Image Detection and Registration", *Digital Image Processing*, Pratt, Wiley, New York, 1991.

*Primary Examiner*—Victor R. Kostak
*Attorney, Agent, or Firm*—Ratner & Prestia

[57] ABSTRACT

A content based method is used to download/record digital video from networks to client stations and home VCRs. In this manner, the disadvantages associated with conventional time-based downloading of programs to analog video is avoided. The method includes the steps of receiving each of the video programs, identifying one of the programs from those received based upon frame signature matching, preloaded pattern searching, annotation signal searching or program bar code searching and saving the desired video program based upon the performed identification. Alternately a storage apparatus is included for storing selected signals. Furthermore, content based filtering is included for identifying selected signals and for transferring the identified selected signals to the storage device.

16 Claims, 3 Drawing Sheets

METHOD AND APPARATUS FOR CONTENT BASED DOWNLOADING OF VIDEO PROGRAMS

FIELD OF THE INVENTION

The present invention relates to downloading of video signals. In particular, a method and apparatus are disclosed for content based downloading of video signals from networks to client stations and home VCRs.

BACKGROUND OF THE INVENTION

Promising multimedia technologies have had a significant impact on both information and entertainment providing services. Recent advances in compression techniques have, for example, greatly reduced the size of digital video signals. This has overcome three major difficulties for handling digital video:

1) The prohibitively large storage required to store digital video data;
2) The existence of relatively slow storage devices for real-time video play-out; and
3) Insufficient network bandwidth for real-time video transmission.

Digital video has various advantages over analog video including improved quality, scalability and portability, simplified editing, efficient storage/retrieval and simplicity in being incorporated into a hyper-media environment (i.e. an environment in which video audio and text are all found). In view of all of these advantages, it is believed that digital video will become the prevalent standard for video transmission for years to come.

Video-on-demand has been identified as an area with a fast growing market. In video-on-demand, a video server is expected not only to concurrently serve many clients (on the order of hundreds or thousands), but also to provide many interactive features for video playout, which home viewers currently enjoy from current VCR systems. However, studies have indicated that to meet these requirements, the server would desirably require a tremendous amount of computing power, storage, and communication bandwidth. Thus, the feasibility of providing interactive video viewing over a network (including backbone and cable networks) requires further cost justification. Consequently, an alternative solution would be to download the video data into a storage facility located at the client station (or home VCR) which the end viewer can directly operate.

Currently, in a commercially available VCR, downloading is typically a time-based function. Specifically, the viewer specifies channel, starting time and event duration in order to record an event of interest. However, after the viewer has specified this information, the actual starting time or event duration of the event of interest may change. Furthermore, in some situations, the viewer may not know in advance the event duration. For example, a tennis match can last from one to five hours. Furthermore, the starting time of a regular program may be changed due to the occurrence of unexpected events such as encores in musical concerts, overtime in sports (i.e., extra innings in baseball), unscheduled presidential speeches or news reports, etc. As a result, if time based recording is being used, a viewer may waste a tremendous amount of storage capacity (e.g. up to 400% in the tennis match example above) or miss part or all of the event of interest.

SUMMARY OF THE INVENTION

The present invention relates to a method and apparatus for downloading a video program from a source of multiple video programs. In one exemplary embodiment, the present invention includes the steps of receiving each of the video programs, identifying one of the programs from those received based upon frame signature matching, pre-loaded pattern searching, annotation signal searching or program bar code searching and saving the desired video program based upon the performed identification. In an alternative embodiment of the present invention, a storage apparatus is included for storing selected signals. Furthermore, content based filtering is included for identifying selected signals and for transferring the identified selected signals to the storage device.

DETAILED DESCRIPTION OF THE INVENTION

The use of time-based downloading (as opposed to content based downloading) stems from the difficulty of probing the video content in its analog form. This difficulty, however, is significantly alleviated by the use of digital video. Current technology enables the content of digital video to be probed so that pattern matching can be conducted in an efficient manner. This can be accomplished even when the digital video is in a compressed form. Accordingly, content based downloading can be readily accomplished with digital video signals.

Figure 1:
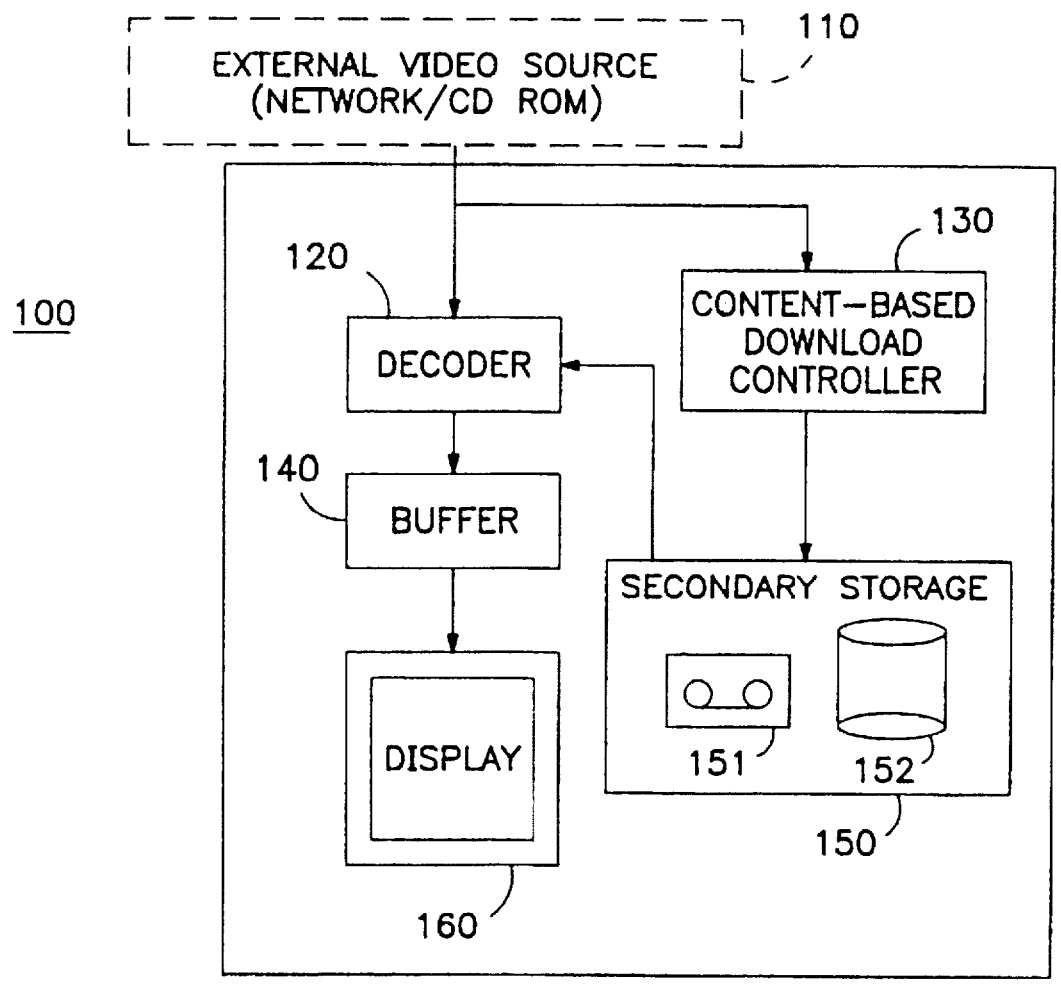
FIG. 1 is a block diagram of an apparatus for performing content based downloading of a particular program or of particular signals.

An exemplary embodiment of the present invention is shown in FIG. 1. Video signals are received from an external video source 110 (e.g. a source of multiple programs such as a network, a CD ROM, etc.). The signals are decoded by decoder 120 and are buffered by buffer 140 before being displayed on display device 160. Each of the video programs may also be received by content based download controller 130.

Content based download controller 130 is capable of probing the video content of the video signals received from external video source 110. By probing the content of the video signal, content based download controller 130 is able to determine when a desired video program starts and finishes. Based upon this determination, content based download controller 130 can signal secondary storage device 150 to begin recording the desired video program. As shown in FIG. 1, secondary storage 150 can include video tape 151, computer disk 152, or some other type of information medium. Content base download controller 130 can use a variety of methods to probe video content in order to identify the start and end of a desired video program.

One method by which content based download controller 130 can probe video content is through frame signature matching. Frame signature is simply a reduced set of digital data resulting from certain operations on that frame. This reduced set of digital data uniquely represents that frame. An example of the frame signature is a specific pattern such as the face of an anchorwoman, photo of President Clinton, statue of President Lincoln, or the National Emblem of Finland. This method is useful when the starting and ending frames of an event of interest are known in advance. In other words, the frame signature of the starting and ending frames can simply be prestored. The frame signature can be prestored in the memory in the download controller 130. Upon detection of either of these prestored frames by the content based download controller 130, storage of the desired program by the secondary storage device 150 can be initiated and terminated. The detection of the frame signature can be performed by template matching, as taught in Digital Image Processing by Pratt, Wiley, New York, 1991. Other detection methods include classification, also taught in Digital Image Processing by Pratt, Wiley, New York, 1991, which is incorporated herein by reference.

Frame signature searching can be implemented by one of the following approaches.

One method of performing frame signature searching is using template matching. In template matching, a template of a pattern or photo specified by the user can be used to perform the matching of the first frame in each scene. This template can be used for the frame signature which is prestored in the memory in the download controller 130. One manner in which template matching can be achieved is through match filtering. In match filtering, the template is correlated with the image to search for locations where maximum similarity occurs. A detailed algorithm for performing match filtering can be found in Pratt, Digital Image Processing, Wiley, New York, 1991, at page 653 et seq.

Another way in which frame signature searching can be performed is by object recognition through shape analysis. To perform object recognition through shape analysis, topological attributes such as curvature, connectivity, etc. can be extracted from each object in an image. Again, this is typically the first frame of a scene. The extracted attributes are then matched against those attributes extracted from the template specified by the user. Extraction of topological attributes is described for example in Pratt at page 629 et seq. which is incorporated herein by reference. The extracted attributes are then matched against those attributes extracted from the template specified by the user.

Matching topological attributes is different from template matching or match filtering. Each of the attributes is usually represented by a real number (e.g. "a"). Thus, the image is said to contain topological features similar to that of a template if $$\text{distance}(a, a') < \text{epsilon},$$

where a is computed from the image, and a' is computed from the template, distance is any distance function such as Euclidean distance defined as $d(x-y)=\|x-y\|$ and epsilon is a prescribed threshold.

The template can be specified by the user in a number of ways:

1) Providing a photo (e.g. through scanning).
2) Selecting from a prestored set of images or patterns.
3) A sketch entered through keyboard/mouse.
4) Composed by other input devices (such as speech recognition, handwriting recognition, etc.).

Another method of performing frame signature searching is through color histogram matching. Color histogram of an image can be obtained by quantizing all possible color combinations into a fixed number of bins (e.g. 4096). The distribution of the color is then accumulated. The distribution of the color histogram can then be used to match against the color histogram specified directly by the user or indirectly extracted from the template provided by the user.

Generation of a color histogram and comparison of this color histogram with the color histogram specified by the user is fully described, for example, in Niblack, W. et al., Research Report—the QBIC Project: Querying Images by Content Using Color, Texture, and Shape, Computer Science, R. J. 9203 (81511), Feb. 1, 1993 which is incorporated herein by reference. Another way of implementing frame signature searching is through texture matching. Texture is used to describe two dimensional variations of an image, in which the elements and rules of spacing or arrangement may be arbitrarily manipulated while a characteristic repetitiveness remains. Texture is more fully described in Pratt, Digital Image Processing, Wiley, New York, 1991, at page 567 et seq. Several commonly used texture attributes such as energy, entropy, coarseness, and brightness can be measured from an image. The matching process may be performed in accordance with various methods as would be known to one of ordinary skill in the art of digital image processing. An exemplary matching process is set forth below.

First, the images may be divided into regions. This can be accomplished based on boundaries detected from the edge detector. Boundaries are detected by the edge detector by passing the image $I(x,y)$ through a Laplacian of Gaussian operator, defined as $$\text{LOG } (I(x,y))=(g''(x)\ g(y)+g''(y)\ g(x))\ I(x,y)$$

where $$g''(x)=1/(\text{sqrt}(2*\text{pi})*\text{sigma}*\text{sigma})*(x*x/(\text{sigma}*\text{sigma})-1)*\exp(-x*x/(\text{sigma}*\text{sigma}))$$

$$g(x)=1/(\text{sqrt}(2*\text{pi})*\text{sigma}*\text{sigma})*\exp(-x*x/(\text{sigma}*\text{sigma}))$$

$$g''(y)=1/(\text{sqrt}(2*\text{pi})*\text{sigma}*\text{sigma})*(y*y/(\text{sigma}*\text{sigma})-1)*\exp(-y*y/(\text{sigma}*\text{sigma}))$$

$$g(y)=1/(\text{sqrt}(2*\text{pi})*\text{sigma}*\text{sigma})*\exp(-y*y/(\text{sigma}*\text{sigma}))$$

where sigma is the spread of this operator.

The zero crossing of the output is the edge of the original image.

Another way of dividing the images into regions is through quadtree type of spatial decomposition. This is described for example in Smith, J. et al., Quadtree Sigmentation for Texture Based Image Query, Proceedings of the ACM Multimedia 94, San Francisco, 1994, which is incorporated herein by reference. Texture features such as coarseness, brightness, entropy, and energy from each region are then computed.

Assuming the histogram of the image is $h[j]$, where $i=0, \ldots,$ (Gray Level $-1$) (Note that $h[j]$ has been normalized between 0 and 1):

$$m = \sum_{i=0}^{G-1} i\, h[i]$$

$$\text{Energy} = \sum_{i=0}^{G-1} i^2\, h[i]$$

$$\text{Var} = \sum_{i=0}^{G-1} (i-m)^2\, h[i]$$

$$\text{coarseness} = 1 - \frac{1}{1+\text{Var}}$$

-continued $$\text{entropy} = - \sum_{i=0}^{G-1} h[i] \log(|h[i]|)$$

As known to one of ordinary skill in the art, many other texture features which are defined in various image processing textbook.

The featured vector of the target template (which usually shows the texture of the desired image and which is specified by the user) is then computed.

Feature vector, F, of an image is defined as follows:

F=(f1, f2, f3, ..., fn)

where fi is one of the features (or attributes).

Feature vectors are extracted from the image and the target template as follows:

Feature vector of the images: F1=(f11, f21, f31, ..., fn1)

Feature vector of the template: F2=(f21, f22, f32, ..., fn2)

The distance between the feature vector of the target image and the feature vectors of all the regions of an image can then be computed.

The distance between two feature vectors can be computed as follows:

$$d = \sqrt{\sum_{i=1}^{n} (fi1 - fi2)^2}$$

A feature vector for each region of an image can be computed and the distance between these vectors and the feature computed from the target template is computed. The regions with minimum distance can then be selected.

A second method of probing video content is through the use of bar codes compressed into the video stream. Bar codes can be predetermined numbers which signify, for example, the start or end of a certain event.

Bar codes may be similar to those typically seen at present in the retail industry. They may be computer generated. The bar code can be embedded, for example, at the beginning or end of a program (i.e., the bar code occupies the entire image) or in a corner of the first and last scenes of the program. This is slightly less intrusive to the viewer. Bar code matching is similar to frame signature matching. However, in bar code matching, template matching alone is sufficient.

In addition to recording a single event (i.e. a desired television program) the present method can be extended to the downloading of a group of events (i.e. all news, weather forecasts, childrens television characters, etc.). Thus, by using preloaded pattern searching or annotation signal searching, each of these types of programs can be identified. Again, the secondary storage device 150 could then be signalled to begin recording each of these types of events. Basically, in preloaded frame signature searching, downloading is triggered when any one of the download start patterns occur in the video stream, while the download operation is halted when anyone of the download complete patterns occur in the video stream. Both preloaded download start and download complete patterns are stored in the memory of the controller 130.

In annotation signal searching, similarly, the download operation is started when the annotation signal contains the pattern which matches one of the prestored pattern set for triggering the starting operation. The download operation is terminated when the annotation signal contains the pattern which matches one of the prestored pattern set for triggering the ending operation.

The annotation signal can be carried in a simpler channel which is different than the channel that carries the video streams. Examples include the second audio program SAP channel or the channel that carries the caption. Furthermore, digital video standards such as MPEG provide additional bandwidth so that the annotation information can be multiplexed with the original video stream. The annotation signal can be ASCII text which describes the content of the current program and can itself provide the starting and ending marks of the program. Annotation signal matching can be implemented using, for example, text matching, if the annotation signal is carried by the caption channel or multiplexed with the video stream using one of the digital video compression standards, or by program signature matching, provided the annotation signal uses the SAP channel.

Signature matching can be accomplished by area correlation and feature based matching. These approaches are explained by Pratt, W. K. Digital Image Processing, Wiley Y., at Chapter 20.

A general discussion of preloaded pattern searching and annotation signal searching is set forth in Smoliar, S. W. et al., Content Based Video Indexing and Retrieval, *IEEE Multimedia*, Summer 1994, pages 62–72, which is incorporated herein by reference.

Thus, instead of specifying starting/ending times, the viewer specifies an event (or a sort of event) of interest. Specification of the event is accomplished through the specification of frame signature, barcode, or annotation signals. Specifically, the specification can be accomplished by providing a photo (e.g. through scanning) or sketch, by selecting from a prestored set of images or patterns, by entering through a keypad or a keyboard, or composed by other input devices (such as speech recognition or handwriting recognition).

Once the event has been specified, the event is converted to an instruction to request content base downloading controller 130 to employ a predetermined frame/bar code/ pattern to detect the video content and controller the start/ stop of the downloading. The patterns for triggering the initiation of the downloading are collected into one set, while the patterns for triggering the triggering the ending of the downloading are also collected into one set.

Figure 2:
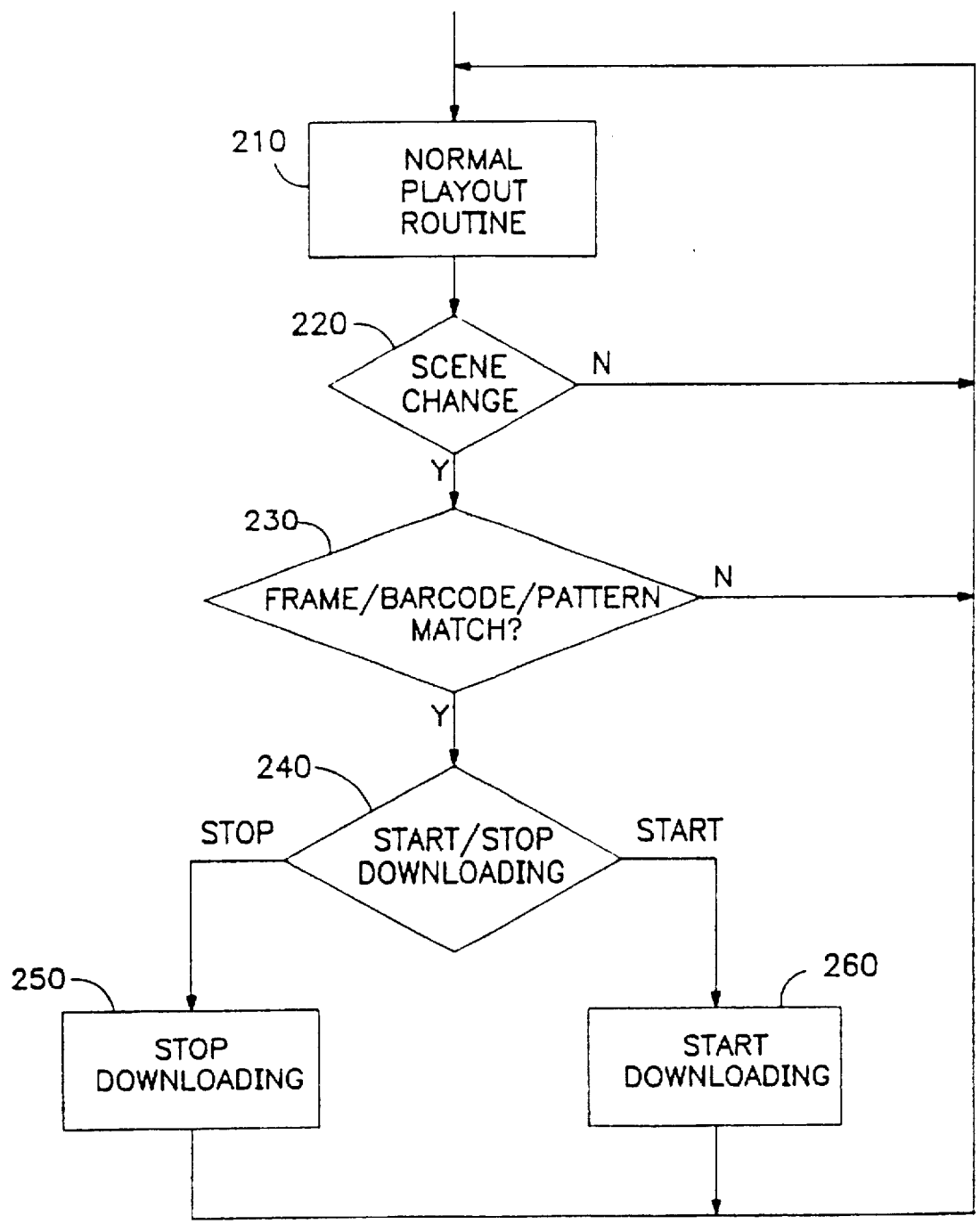
FIG. 2 is a flow chart diagram which illustrates the operation of content based downloading.

In digital video, scene changes can be easily detected by comparing consecutive frames. For better efficiency, the frame/bar code/pattern detection need only be performed when a scene change occurs. Operation is then illustrated in accordance with the flow chart of FIG. 2. At step 210, playout of the video program is occurring. At step 220, a scene change is detected. Scene change detection is accomplished in accordance with the reference Content-Based Video Indexing and Retrieval by Smoliar, which is incorporated herein by reference. At step 230, if there is a frame/bar code/pattern match, then, at step 240, a decision is made with regard to downloading. For example, at step 250, downloading is stopped. Alternatively, at step 260, downloading is started.

In an alternative embodiment of the present invention, the concept of content based downloading is generalized into content based filtering. This is useful, for example, for collecting interesting information from streams of hypermedia data (video/audio/text) in, for example, an information superhighway. The use of content based filters in a hypermedia environment is illustrated in FIG. 3.

Figure 3:
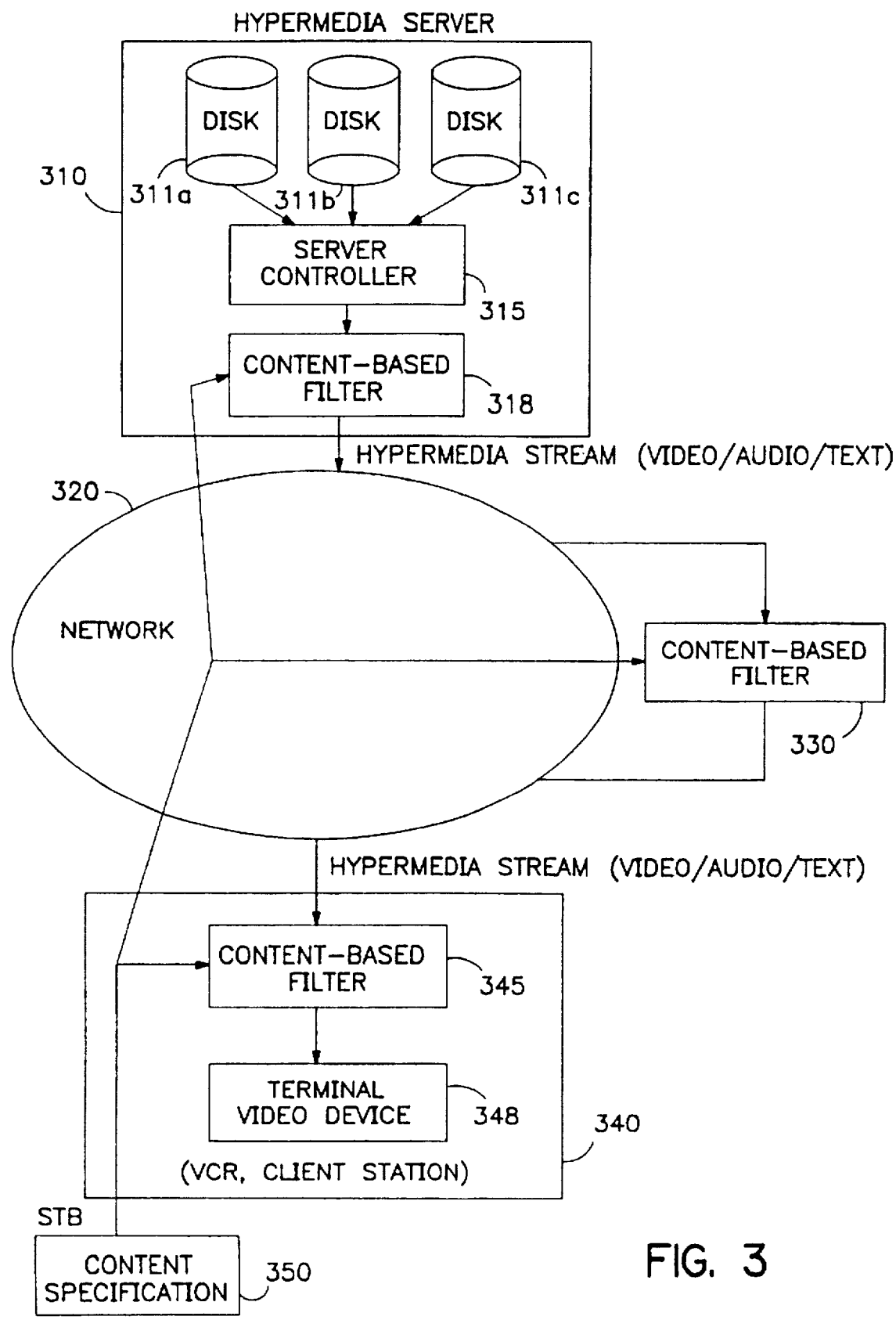
FIG. 3 is a block diagram which illustrates the use of content based filters in a hypermedia environment.

As shown in FIG. 3, hypermedia server 310 may include disks 311a, 311b and 311c on which hypermedia data is stored. These disks may be controlled by server controller 315. The hypermedia data is transmitted from hypermedia server 310 to network 320. After travelling across network 320, the hypermedia data is received by station 340. Station 340 includes terminal video device 348 for recording the received hypermedia data.

As shown in FIG. 3, Content specifier 350 is also included. Content specifier 350 is the user interface for indicating those signals which are to be transmitted to terminal video device 348. Content specifier 350 operates as follows. Specification of the event is accomplished through the specification of frame signature, barcode, or annotation signals. Specifically, the specification can be accomplished by providing a photo (e.g. through scanning) or sketch, by selecting from a prestored set of images or patterns, by entering through a keypad or a keyboard, or composed by other input devices (such as speech recognition or handwriting recognition).

In one aspect of the present invention, content based filter 318 is used. Content based filter 318 can, for example, receive appropriate signals from content specifier 350 (via network 320) to indicate which signals have been specified by the user for transmission (again via network 320) to terminal video device 348. Content based filter 318 operates as follows.

In an alternative aspect of the present invention, only content based filter 330 need be used. Content based filter 330 is coupled to network 320. Again, content based filter 330 can, for example, receive appropriate signals from content specifier 350 (via network 320) to indicate which signals have been specified by the user for transmission (again via network 320) to terminal video device 348.

In a further exemplary embodiment, only content based filter 345 needs to be used. Content based filter 345 can be coupled to terminal video device 348 in VCR/client station 340. In this embodiment, the hypermedia server 310 and network 320 pass all signals to content based filter 345. Content based filter 345 then identifies those signals which have been indicated by content specifier 350 for receipt by terminal video device 348.

While content based downloading is useful in the broadcasting industry for dealing with videos (and with particular emphasis on exploiting the effect of scene changes as well as utilizing stream filtering in video playout to control VCR operations, content based retrieval is particularly useful in database communities (and particularly dealing with images) with an emphasis on using efficient searching/ indexing techniques to interactively search for a desired object from a large database. In any event, the use of meta data (data which describes data i.e., titles, copyright notices, etc.) in hypermedia streams and program bar codes further simplifies implementation of content based downloading.

One of ordinary skill in the art would also recognize that content based downloading can be applied to search multiple events from multiple video channels. Limitations on this feature are a function of the computing power of the content filter. Thus, for example, a content filter which is able to search a maximum of six events from one channel in real time may also be able to search two events from three channels, or one event from six channels.

The present invention can be implemented on any home VCR/client station to provide content based/downloading capability. Although the invention has been illustrated and described with regard to exemplary embodiments, the invention is not intended to be limited to the details as illustrated and described. Rather, various modifications may be made in the details within the scope and range of equivalence of the claims and without departing from the spirit of the invention.

What is claimed:

1. A method of downloading one video program from a source of a plurality of video programs to a storage medium, said method comprising the steps of:
   a) receiving each of said plurality of video programs;
   b) identifying said one video program by using frame signature matching which is based upon one of (i) texture attributes, (ii) color histogram matching, and (iii) shape matching; and
   c) saving said one video program on said storage medium based on said identification performed in step b.

2. A method of downloading one video program from a source of a plurality of video programs to a storage medium in accordance with claim 1, wherein step b is performed during at least one scene change occurring during transmission of said plurality of video programs.

3. A method of downloading one video program from a source of a plurality of video programs to a storage medium in accordance with claim 1, wherein said frame signature matching is performed on said plurality of video programs in a digitized format.

4. A method of downloading one digitized video program from a source of a plurality of digitized video programs to a storage medium, said method comprising the steps of:
   a) receiving each of said plurality of digitized video programs;
   b) identifying said one digitized video program based upon program bar code searching of at least a portion of said respective plurality of images generated by each of said plurality of digitized video programs; and
   c) saving said one digitized video program on said storage medium.

5. A method of downloading one digitized video program in accordance with claim 4, wherein step b is performed during at least one scene change occurring during transmission of said plurality of digitized video programs.

6. Apparatus for downloading selected signals from a plurality of signals initially stored in a hypermedia signal source, comprising:
   a) storage means for storing said selected signals; and
   b) content based filter means for identifying said selected signals based upon color histogram matching and for transferring said identified selected signals to said storage means.

7. Apparatus according to claim 6, further comprising a network located between said hypermedia signal source and said storage means.

8. Apparatus according to claim 6, further including a content specifier for indicating to said content based filter means, said selected signals to be identified.

9. Apparatus according to claim 8, wherein said content specifier transmits signals to said content based filter means to specify said selected signals to be identified.

10. Apparatus according to claim 7, wherein said content based filter means is located between said hypermedia signal source and said network and wherein said content based filter means transmits only said selected signals to said network.

11. Apparatus according to claim 7, wherein said content based filter means is coupled to said network and wherein said content based filter means receives all of said plurality of signals and enables only said selected signals to be transmitted to said storage means.

12. Apparatus according to claim 7, wherein said content based filter means is located between said network and said storage means and wherein said content based filter means receives said plurality of signals from said network and enables only said selected signals to be transmitted to said storage means.

13. Apparatus according to claim 6, wherein said content based filter means comprises means for searching at least one event from at least one channel.

14. Apparatus according to claim 13, wherein said content based filter means searches at least one of multiple events and multiple channels.

15. Apparatus for downloading selected signals from a plurality of signals initially stored in a hypermedia signal source, comprising:

a) storage means for storing said selected signals; and b) content based filter means for identifying said selected signals based upon texture attributes and for transferring said identified selected signals to said storage means.

16. Apparatus for downloading selected signals from a plurality of signals initially stored in a hypermedia signal source, comprising:

a) storage means for storing said selected signals; and b) content based filter means for identifying said selected signals based upon shape matching and for transferring said identified selected signals to said storage means.

* * * * *